(12) United States Patent
Martynenko et al.

(10) Patent No.: US 8,566,943 B2
(45) Date of Patent: Oct. 22, 2013

(54) ASYNCHRONOUS PROCESSING OF EVENTS FOR MALWARE DETECTION

(75) Inventors: Vladislav V. Martynenko, Moscow (RU); Andrey V. Sobko, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 843 days.

(21) Appl. No.: 12/618,521

(22) Filed: Nov. 13, 2009

(65) Prior Publication Data

US 2011/0083176 A1 Apr. 7, 2011

(30) Foreign Application Priority Data

Oct. 1, 2009 (RU) ................................ 2009136239
Oct. 1, 2009 (RU) ................................ 2009136240

(51) Int. Cl.
*G06F 11/00* (2006.01)
*G06F 12/14* (2006.01)
*G06F 13/00* (2006.01)
*G06F 17/30* (2006.01)
*G11C 7/00* (2006.01)
*G08B 23/00* (2006.01)

(52) U.S. Cl.
USPC ................... 726/24; 726/22; 726/23; 726/25; 726/26

(58) Field of Classification Search
USPC ...................................... 713/188; 726/22–24
See application file for complete search history.

(56) References Cited

U.S. PATENT DOCUMENTS

| | | | |
|---|---|---|---|
| 6,021,438 A | 2/2000 | Duvvoori et al. | |
| 6,789,088 B1 | 9/2004 | Lee et al. | |
| 7,483,972 B2 | 1/2009 | Bhattacharya et al. | |
| 7,664,626 B1 * | 2/2010 | Ferrie | 703/23 |
| 7,797,743 B2 * | 9/2010 | Treacy et al. | 726/22 |
| 7,854,004 B2 * | 12/2010 | van der Made | 726/23 |
| 7,900,258 B2 * | 3/2011 | van der Made | 726/24 |
| 7,904,456 B2 * | 3/2011 | Hennan et al. | 707/737 |
| 7,984,500 B1 * | 7/2011 | Khanna et al. | 726/22 |
| 8,307,428 B1 * | 11/2012 | Hearnden et al. | 726/22 |
| 2002/0093553 A1 | 7/2002 | Judge et al. | |
| 2004/0102923 A1 | 5/2004 | Tracy et al. | |
| 2005/0193291 A1 | 9/2005 | Subramanian et al. | |
| 2005/0193292 A1 | 9/2005 | Lin et al. | |
| 2005/0193295 A1 | 9/2005 | Fenech Saint Genieys | |

(Continued)

FOREIGN PATENT DOCUMENTS

WO WO2007660333 12/2006

OTHER PUBLICATIONS

Network Communication API. W3C Public CVS Repository. Editor's Draft Jul. 27, 2007 Retrieved Feb. 8, 2013, from http://dev.w3.org/cvsweb/~checkout~/2006/webapi/network-api/network-api.html?rev=1.2.*

*Primary Examiner* — April Y Blair
*Assistant Examiner* — Feliciano Mejia
(74) *Attorney, Agent, or Firm* — Bardmesser Law Group (57) ABSTRACT

A system, method and computer program product for malware detection based on the behavior of applications running on a computer system, including: asynchronous processing of system events for malware threat analysis using application filters; analyzing events using heuristic and signature data; analyzing applications behavior and detecting abnormal behavior of "clean" applications; automatically classifying applications (i.e., detecting new versions) based on behavior analysis; automatically analyzing the reliability of web sites based on behavior triggered by the web site accesses; in enterprise networks, detecting abnormalities in configuration of user computer systems; recognizing a user by his behavior profile and using the profile for an automatic configuration of user applications.

20 Claims, 10 Drawing Sheets

(56) References Cited

U.S. PATENT DOCUMENTS

| | | |
|---|---|---|
| 2005/0194075 A1 | 9/2005 | Iwai et al. |
| 2005/0194078 A1 | 9/2005 | Ogawa |
| 2006/0806964 | 7/2007 | Li et al. |
| 2007/0156895 A1 | 7/2007 | Vuong |
| 2007/0174704 A1 | 7/2007 | Shih |
| 2007/0226248 A1 | 9/2007 | Darr |
| 2008/0168555 A1 | 7/2008 | Kratzer et al. |
| 2008/0196099 A1 | 8/2008 | Shastri |
| 2008/0288827 A1 | 11/2008 | Chagoly et al. |
| 2008/0320075 A1 | 12/2008 | Livshits et al. |
| 2008/0320594 A1* | 12/2008 | Jiang ............... 726/24 |
| 2009/0024991 A1 | 1/2009 | Campbell et al. |
| 2009/0044024 A1* | 2/2009 | Oberheide et al. ............ 713/188 |
| 2009/0083852 A1 | 3/2009 | Kuo et al. |

* cited by examiner

ASYNCHRONOUS PROCESSING OF EVENTS FOR MALWARE DETECTION

CROSS-REFERENCE TO RELATED APPLICATIONS

This application claims priority to Russian Patent Application No. 2009136240, filed Oct. 1, 2009, and to Russian Patent Application No. 2009136239, filed Oct. 1, 2009, both of which are incorporated by reference herein in their entirety.

BACKGROUND OF THE INVENTION

1. Field of the Invention

The present invention is related to anti-malware technology, and more particularly, to malware detection based on the behavior of applications running on a computer system.

2. Description of the Related Art

Detection of viruses and malware has been a concern throughout the era of the personal computer. With the growth of communication networks such as the Internet and increasing interchange of data, including the rapid growth in the use of e-mail for communications, the infection of computers through communications or file exchanges is an increasingly significant consideration. Infections take various forms and are typically related to computer viruses, Trojan programs or other forms of malicious code (i.e., malware).

Recent incidents of e-mail mediated virus attacks have been dramatic both for the speed of propagation and for the extent of damage, with Internet service providers (ISPs) and companies suffering from service problems and a loss of e-mail capability. In many instances, attempts to adequately prevent file exchange or e-mail mediated infections significantly inconvenience computer users. Improved strategies for detecting and dealing with virus attacks are desired.

A conventional approach to detecting viruses is signature scanning. Signature scanning systems use sample code patterns extracted from the known malware code and scan for the occurrence of these patterns in another program code. A primary limitation of the signature scanning method is that only the known malicious code is detected, that is, only the code that matches the stored sample signatures of known malicious code is identified as being infected. All viruses or malicious code not previously identified, and all viruses or malicious code created after the last update of the signature database will not be detected.

Another conventional approach is emulation of malware components. An ability to emulate an execution of a suspected malware component on a computer system prior to executing it on a user system is critical in terms of providing security and maintaining integrity of a computer system data. Emulation is typically used for anti-virus and malware detection. In order to analyze the behavior of malware components, such as viruses, and to collect statistics (heuristics), a computer system is emulated and the viruses are run on the emulated computer system. The behavior of the suspected component during emulation is logged. The behavior log is later compared to normal behavior patterns.

However, over the past decade malware components and viruses have become more sophisticated. Modern malware components can avoid emulation. Additionally, heuristic analyses of a potential malware component cannot always be performed in a timely manner. Event interception and on-the-fly synchronous analysis can also be used. For example, such a system is disclosed in the WO2008048665A2. However, a synchronous analysis delays the execution of the process generating the suspicious event. In turn, it causes a delay in functionality of the entire system.

Figure 1:
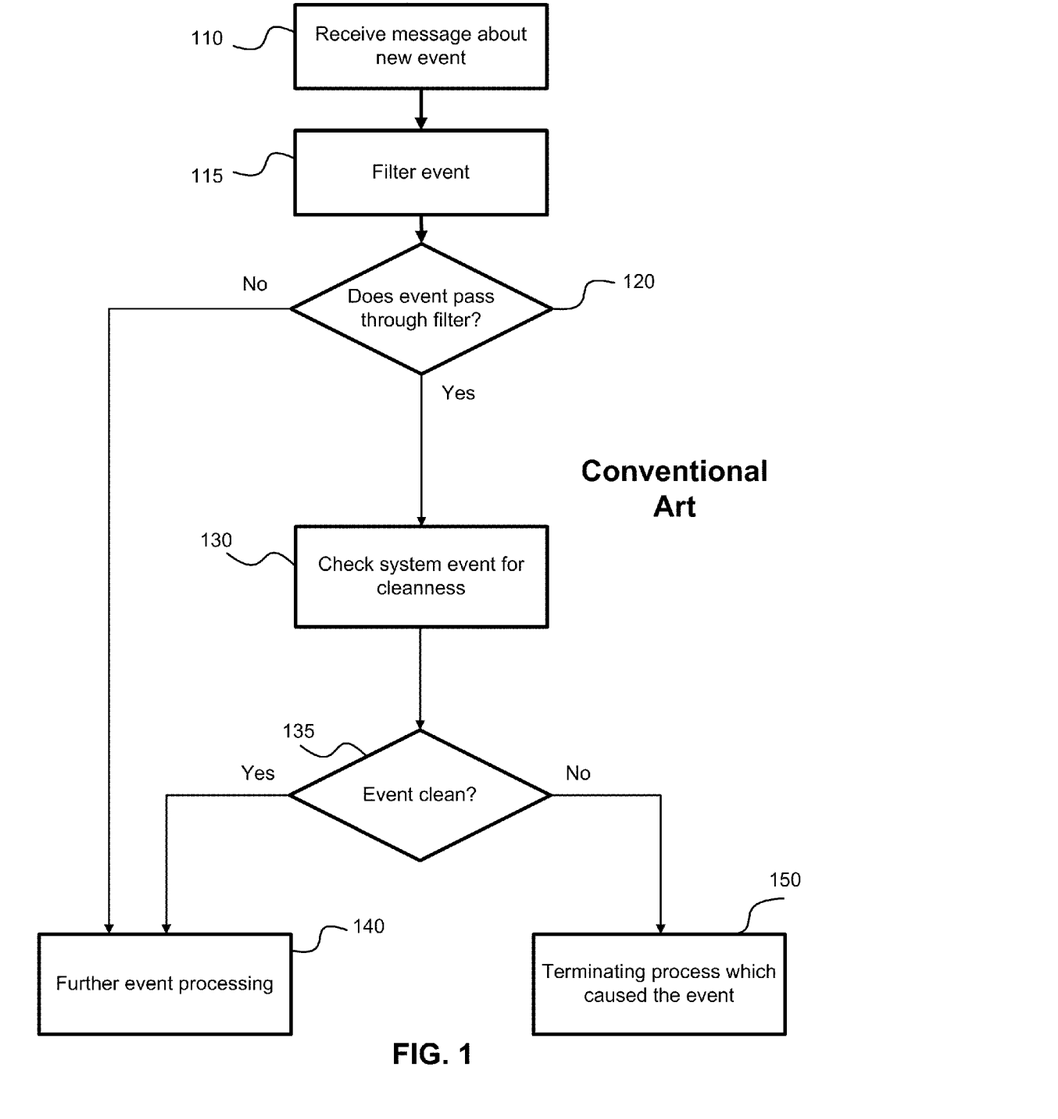
FIG. 1 illustrates a conventional method for malware detection using synchronous processing of system events.

Event filtering techniques are also used for analyzing the behavior of running suspicious applications. For example, such a method is described in the U.S. Pat. No. 7,406,199. The processes generating suspicious events which have been filtered out are checked first and then sent for further processing. An algorithm of a conventional filtering method, using a synchronous event processing, is depicted in FIG. 1.

In this method, an event is sent for processing after the process which triggered the event has been checked. After an occurrence of a system event is detected in real time, in step 110, a system driver processes the event through a number of filters in step 115. If the event passes through the filter(s) in step 120, the event is sent to be checked by system modules in step 130.

If in step 135, it is determined that the event is not clean (i.e., presents a potential threat to the system), the process that caused the event is terminated in step 150. If the event is determined to be clean (in step 135) or the event does not pass through the filter (in step 120), the event is released for further processing in step 140. This method is time consuming and requires a lot of system resources, which is also quite costly.

It is apparent that an improved efficient method for analyzing the behavior of applications running on a computer system is desired. Accordingly, there is a need in the art for a system and method that addresses the need for detection of malware based on the behavior of applications running on a computer system.

SUMMARY OF THE INVENTION

The present invention is intended as a method and system for malware detection based on the behavior of applications running on a computer system that substantially obviates one or several of the disadvantages of the related art.

In one aspect of the invention, there is provided a system, method and computer program product for malware detection based on a behavior of applications running on a computer system, including: asynchronous processing of system events for malware threat analyses using application filters; analyzing events using heuristic and signature data; analyzing applications behavior and detecting abnormal behavior of "clean" applications; automatically classifying applications (i.e., detecting new versions) based on the behavior analysis; automatically analyzing the reliability of web sites based on the behavior triggered by the web site accesses; in enterprise networks, detecting abnormalities in configuration of user computer systems; recognizing a user by his behavior profile and using the profile for an automatic configuration of user applications.

The malicious object (i.e., component) can be, for example, a trojan, a virus, a rootkit or a worm. According to an exemplary embodiment, the existing methods of malware detection are accelerated. In one aspect, the system events are processed asynchronously and the applications generating the events are analyzed in terms of being malicious. The proposed method allows comparing the behavior of an application against a set of rules defining a sequence of the normal system activities. Each rule defines a set of actions of a trusted application and actions of malware components. Therefore, a proposed method optimizes processing of a malware threat and increases probability of malware detection.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

In one aspect of the invention, there is provided a system, method and computer program product for malware detection based on behavior of applications running on a computer system.

According to the exemplary embodiment, the existing methods of malware detection are accelerated. The events are processed asynchronously and the applications generating the events are analyzed in terms of being malicious. The asynchronous processing of the events allows to process the events caused by processes (i.e., applications) while these processes continue to run on a computer system. According to the proposed method the behavior of an application can be compared against a set of rules defining a sequence of the normal system activities (i.e., behavior patterns). Each rule defines a set of actions of a trusted application and the actions of malware components.

Figure 2:
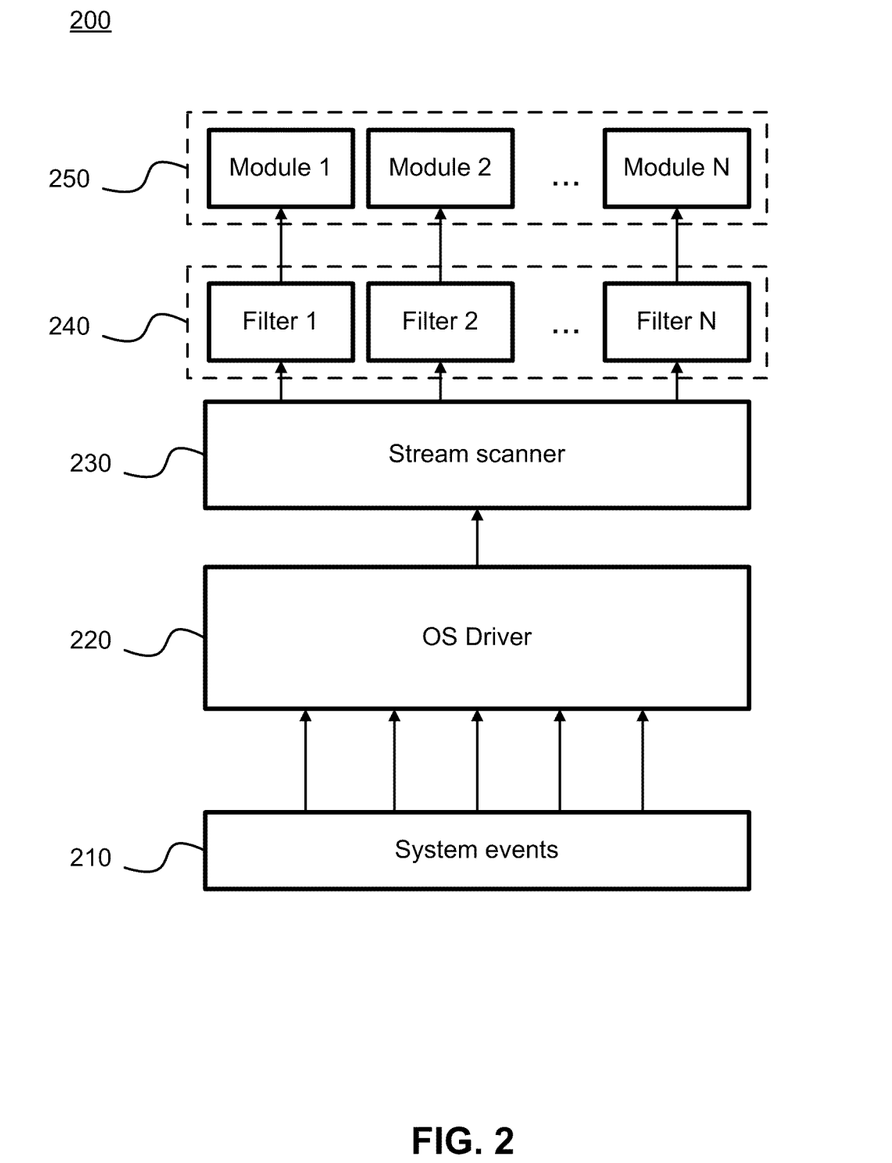
FIG. 2 illustrates a system for malware detection, in accordance with an exemplary embodiment.

FIG. 2 illustrates a system 200 for malware detection, in accordance with the exemplary embodiment. An OS driver 220 controls execution of application modules 250 via a stream scanner 230. The applications can be, for example, a HIPS (Host Intrusion Prevention System), a PDM (Proactive Defence Module, intended to detect malware based on their behavior—the behavior of the software is compared to a particular template, and if the behavior corresponds to the template, the user is given a warning, and, if necessary, further activity of the application is blocked, and any system changes made by the application are rolled back), a firewall, web AV (antivirus), mail AV, traffic AV, script AV, emulator, etc. The OS driver 220 also communicates with other anti-virus (AV) components through the stream scanner 230. The stream scanner 230 allows the OS driver 220 to create and configure filters 240 for application modules 250. Each application module 250 can have its own filter 240 for a particular application. Note that the filters 240 allow through the core system events 210 (such as system calls for file creation, call for reading registry, etc.)

After the OS driver 220 intercepts the new event 210, it passes the event 210 to the stream scanner 230, which puts the event 210 through the filters 240. If the event 210 passes through at least one filter 240, the stream scanner 230 copies the event 210 and places it in a queue of events to be processed by application modules 250. Then, the original event 210 is released for further processing.

Figure 3:
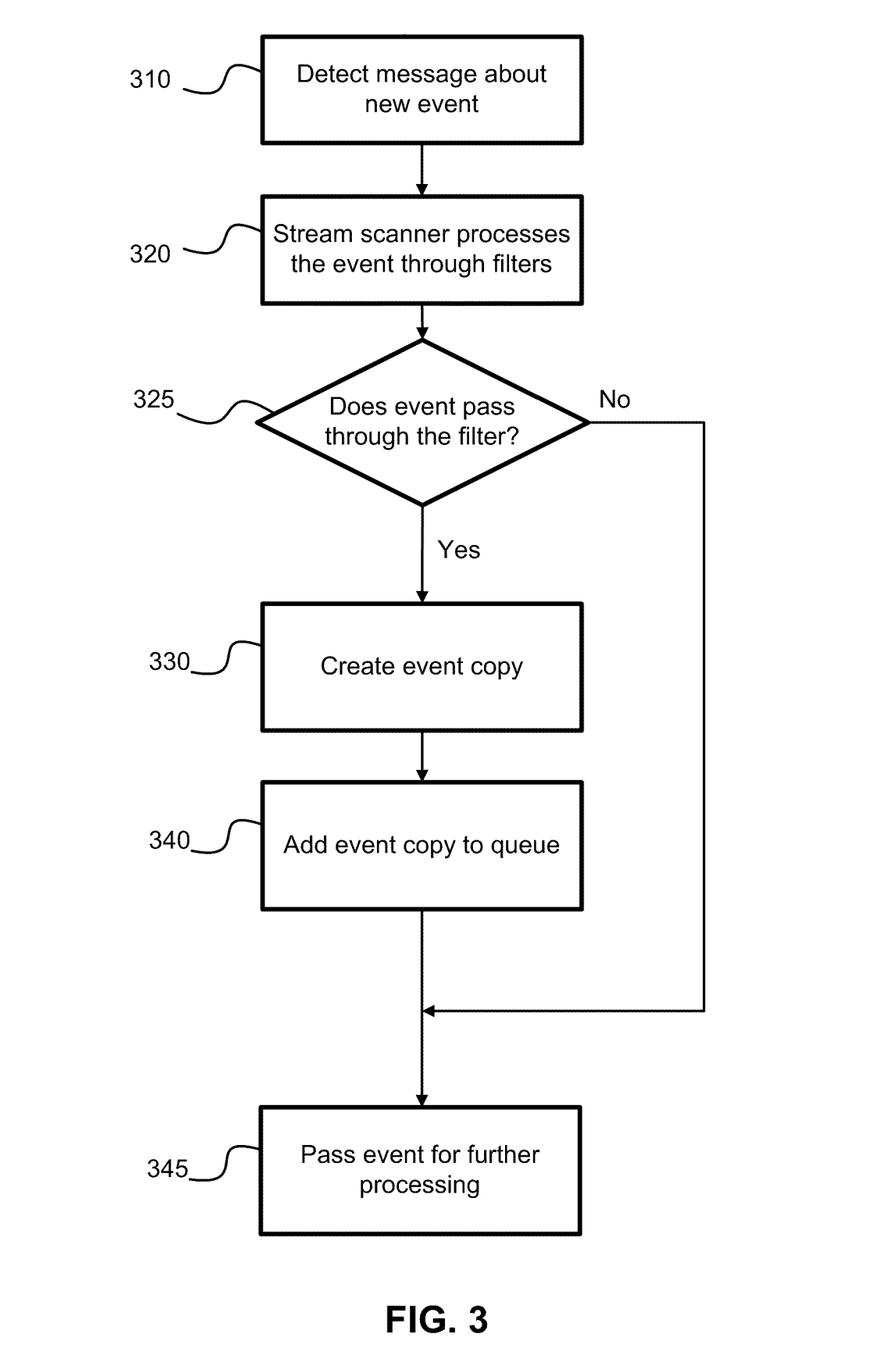
FIG. 3 illustrates an algorithm for asynchronous event processing, in accordance with the exemplary embodiment.

An algorithm of asynchronous event processing is shown in FIG. 3. After an occurrence of a system event is detected in step 310, it is intercepted by the system driver for processing it through a number of filters of different system modules in step 320. If the event passes through the filter(s) in step 325, a copy of the event is created in step 330. The copy of the event is added to the event queue in step 340. Then the original event is released for further processing in step 345. If, in step 325, the event does not pass through at least on of the filters (i.e., does not match a filtering security criteria) it is sent for further processing in step 345.

Figure 4:
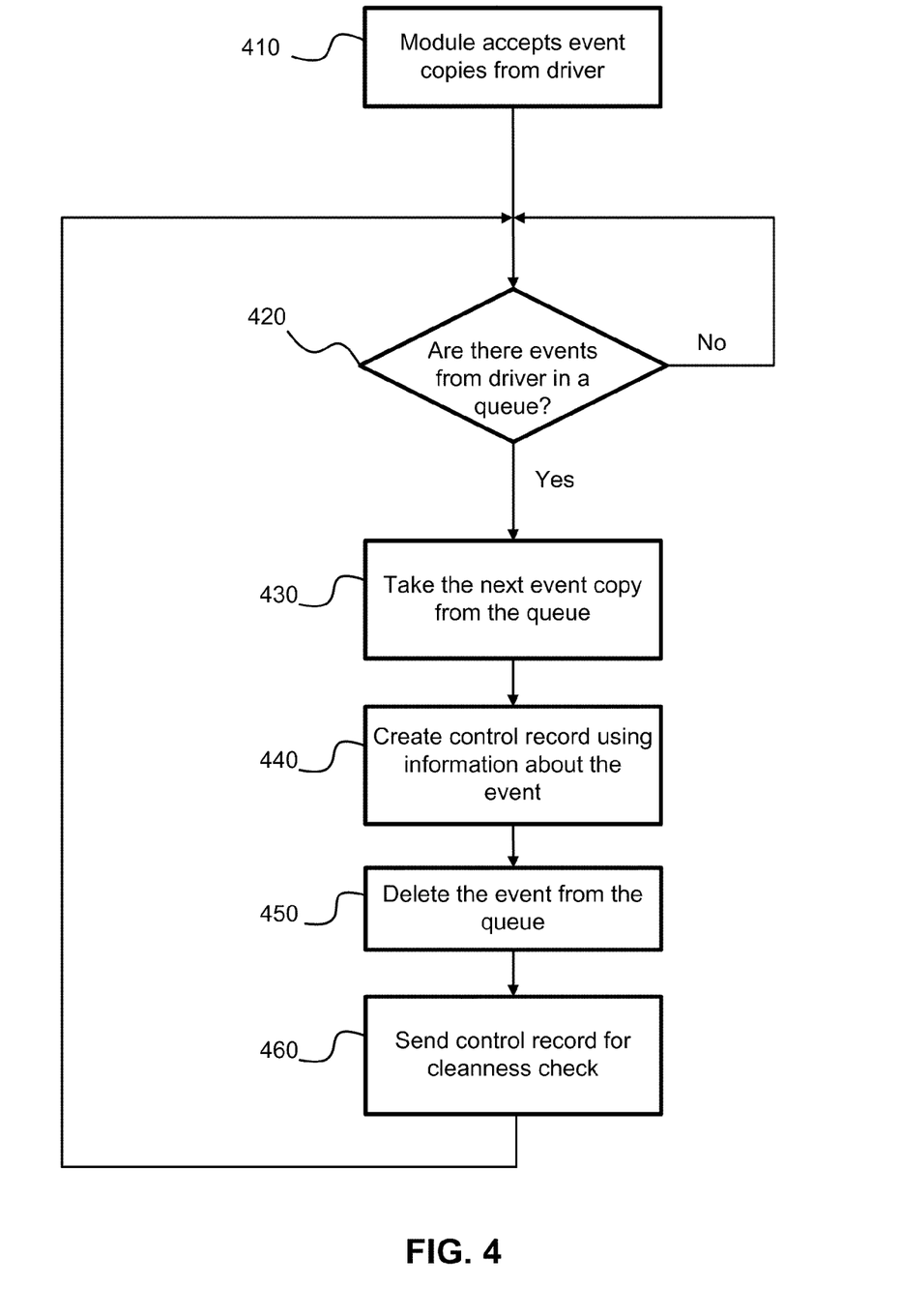
FIG. 4 illustrates an algorithm for asynchronous processing of system events by a stream scanner, in accordance with the exemplary embodiment.

FIG. 4 illustrates an algorithm for asynchronous processing of the system events by a stream scanner. At certain time intervals, each system module checks, in step 410, for events passed through its filter and placed in a queue. If an event is detected in step 420, the system module makes a copy of the event for processing in step 430. During processing, the event is converted into a control record in step 440. Then, the copy of the event is removed from the queue in step 450. The control record is passed to the anti-virus utility for an AV check in step 460. If the AV check reveals a malicious nature of the event, the process that caused the event, is blocked and terminated.

According to the exemplary embodiment, the event processing is advantageously asynchronous. The event is released and the process, which caused the event, continues its uninterrupted execution. Thus, the system does not stop any processes and malware check is performed without being noticed by a system user. While reaction of the OS core system to a malware process is delayed, compared to a synchronous event processing, the delay is a very short period of time and the malicious process cannot harm the computer. The harm caused by malware process during the delay period can be easily compensated by roll backs, incremental backups (snapshots), virtual copies etc. Therefore, the proposed method advantageously optimizes functionality of the computer system.

Figure 5:
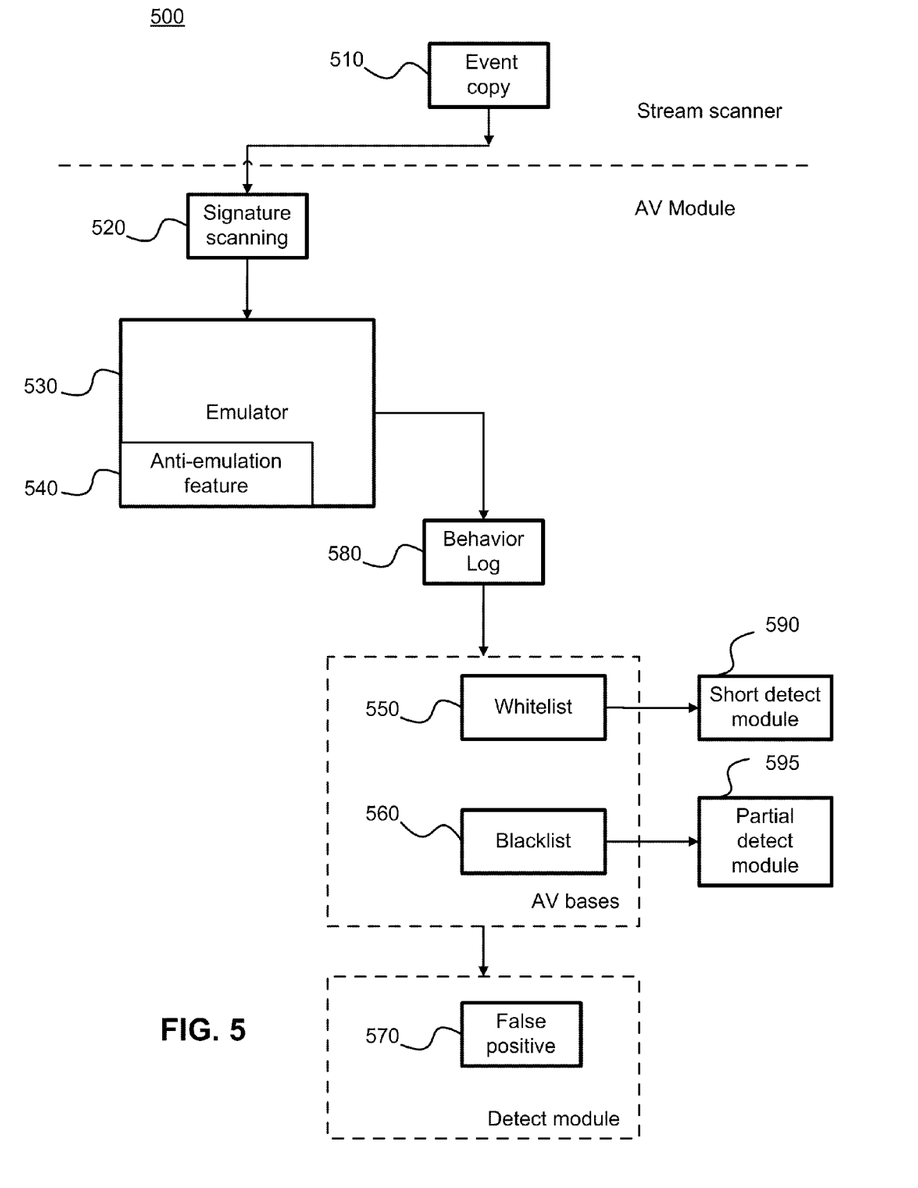
FIG. 5 illustrates event handling in an AV module, in accordance with the exemplary embodiment.

FIG. 5 illustrates event handling in an AV module, in accordance with the exemplary embodiment. The event copy is received by the stream scanner in step 510. Then methods of signature scanning 520 and heuristic detection 580 are applied. The signature scanning 520, in the exemplary embodiment, can use short signatures (i.e., behavior characteristics taken over a short period of time) for malware detection. These signatures can reflect, for example, a combination with an IP address or creation of a file in system directory. A life of a signature or a security level can also be pre-set.

A suspicious process can be executed in an emulator 530. While the emulator 530 uses the anti-emulation feature 540, it can still be deceived by some modern malware processes. These processes change its execution algorithm, once they detect that they are being executed on the emulator. This problem is solved, in the exemplary embodiment, by generating a behavior log 580 of a suspicious process. Combination of the behavior log 580 and signature scanning 520 allows generation of a white list 550 and a black list 560 AV records. The black list 560 and the white list 550 are analyzed for collisions by a false positive utility 570 of a detect module.

The white lists are the lists of known "clean" software components, links, libraries and other clean objects. In order to compare a suspect object against the white list, hash values can be used. For example, a white list can consist of hashes of known "clean" applications. Also, checksums can be calculated and compared against the known checksums. A black list is a collection of known malware objects. In order to be effective, the white lists and the black lists have to be constantly updated. The proposed system can be used for updating the white and black lists.

Based on a short time behavior detection, the white list 550 can contain "short time detect" modules 590, the modules that are detected based on their behavior statistics collected over a short period of time. These modules can have the following behavior patterns: writing into a new branch of a registry, loading a certain library, reading from the system registry, etc.

The black list 560 can contain "partial detect" modules 595. These are components that could not be definitively determined to be malware. These modules can have the following behavior patterns: self-copying, registration in the system registry, copying into a system folder, etc.

The data from the white list 550 and the black list 560 is not normally shown to a user. Instead, it is sent, by the AV application installed on the user system, to an AV lab. Then, the data is added to the global white and black lists respectively for further research of suspicious processes.

The anti-emulator feature works as follows:

The first thing that a malicious program might try to do is to determine whether it is running under an emulator. This can happen, for example by (a) initiating a "rare" system API call, knowing in advance what the return value of the API call should be. If this API call is not supported by the emulator, then the return value is not what a "live" system would return. The malicious program would then conclude that it is running under an emulator. Another common approach is (b) invoking an undocumented system or invoking a standard API but with unusual or borderline parameters. If the emulator does not support this undocumented API or these parameters, then the return result will not be the same as with a "live" system. The malicious program will therefore know that it is running under an emulator. In that case, it will terminate its activity without performing any malicious acts. On the other hand, if it believes that it is running on a "live" system, it will feel free to perform malicious acts.

Figure 6:
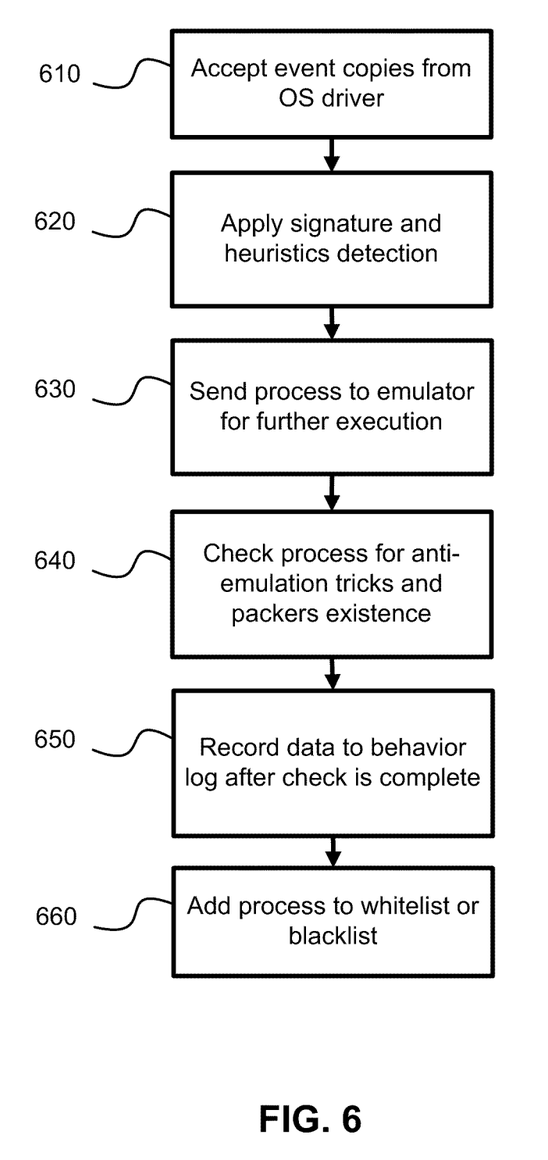
FIG. 6 illustrates a method for updating the white and black lists, in accordance with the exemplary embodiment.

A method for updating the white and black lists using asynchronous event processing is illustrated in FIG. 6. It step 610, an event (suspicious object) copy is received from the stream scanner. Signature and heuristic detection methods are applied to the event copy in step 620. The process, which caused the event, is sent to an emulator for further analysis in step 630. The process is checked for anti-emulation features and packers in step 640. Then, the heuristic data is recorded into a behavior log in step 650. The process is classified as "clean" or malicious and is added to either white or black list, accordingly (in step 660).

Figure 7:
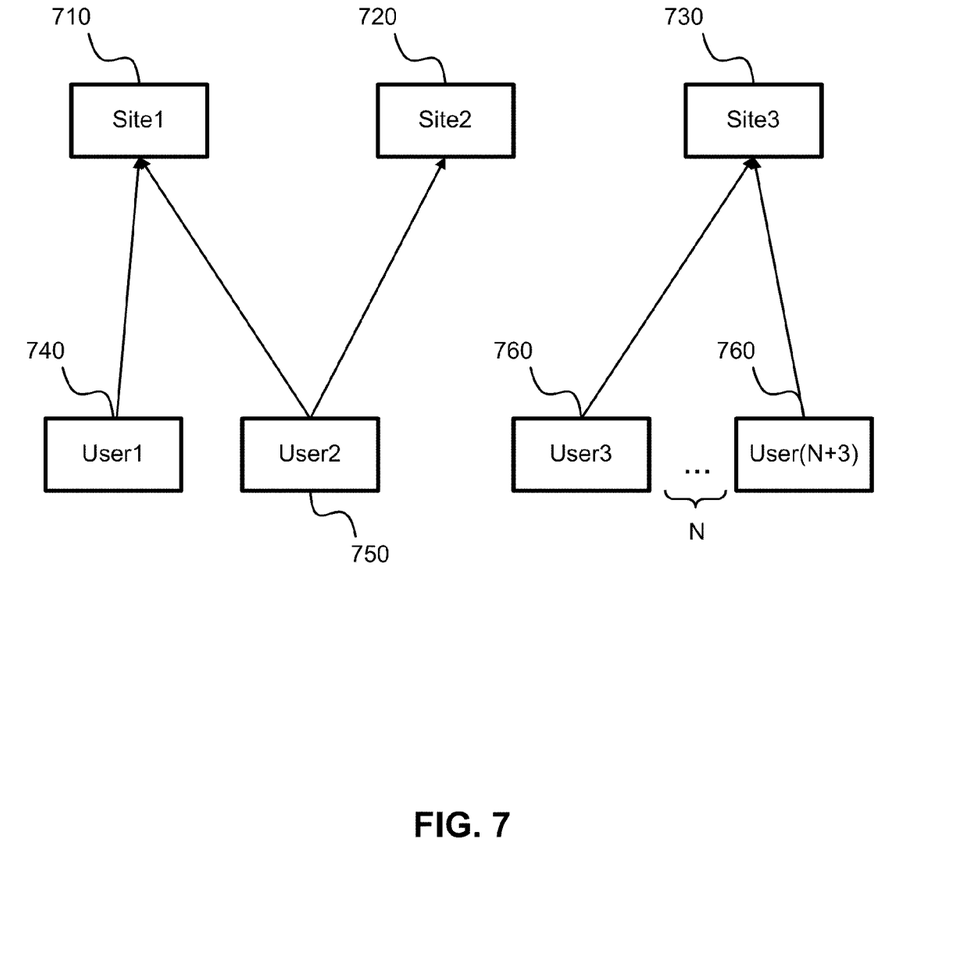
FIG. 7 illustrates detection of malicious web sites, in accordance with the exemplary embodiment.

FIG. 7 illustrates dealing with potentially malicious web sites. Detection and quick reaction to malicious web sites is important. The main criterion of a potentially malicious web site is a massive number of accesses from different users over a short period of time. FIG. 7 illustrates an example of monitoring a number of sites over a short period of time. Sites 710 and 720 are the sites working in a normal mode, i.e., being accessed by a normal number of users 740 and 750. Site 730 has an abnormal number of site accesses by N number of users 760. If the number of users N exceeds a certain limit, the site 730 can be considered malicious.

Figure 8:
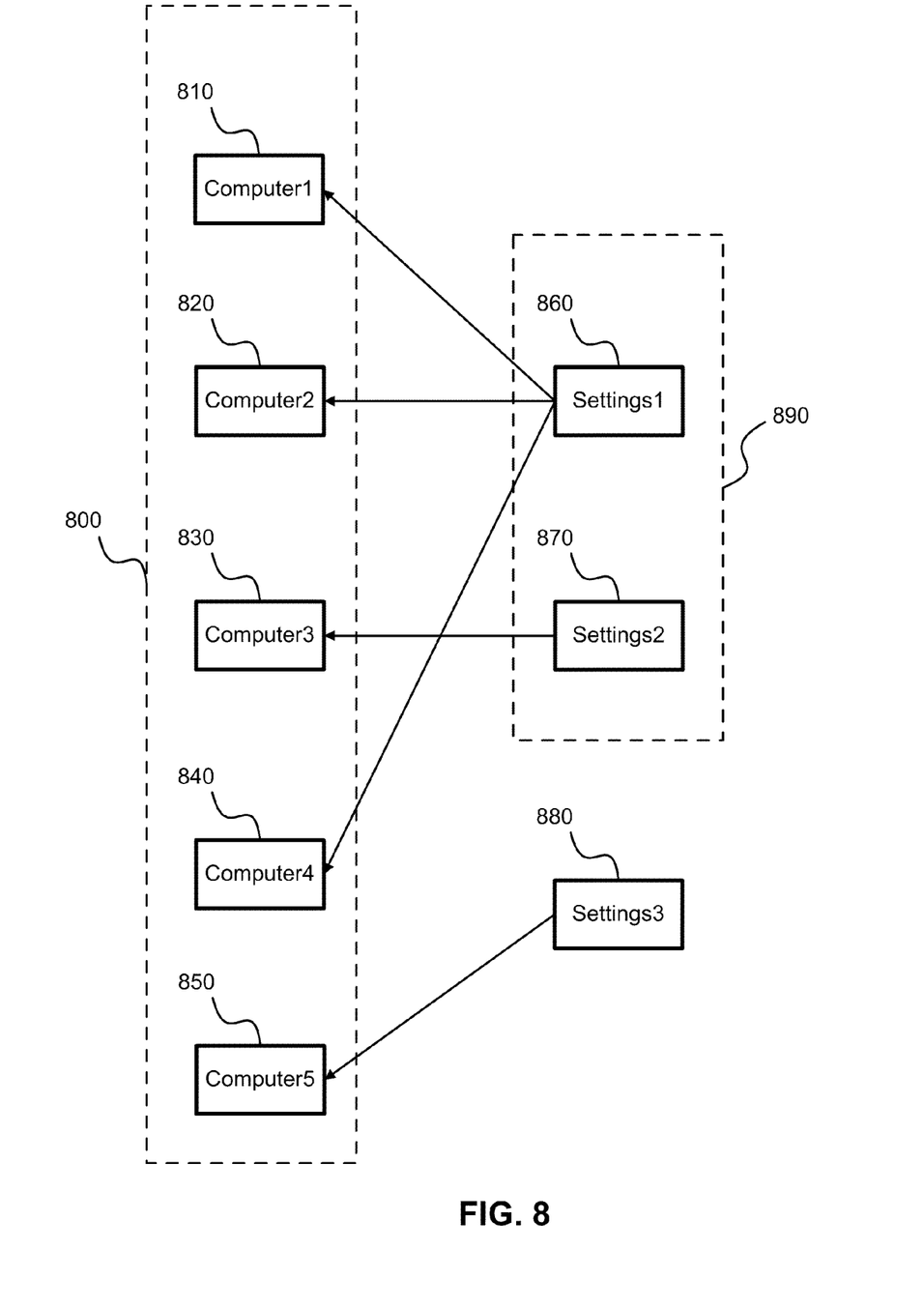
FIG. 8 illustrates detection of abnormalities in network configurations, in accordance with the exemplary embodiment.

In another embodiment, abnormalities within network configurations can be used for malware detection. FIG. 8 illustrates detection of abnormalities in the network configurations. A corporate network 800 including computer systems 810-850 is monitored. A set of computer configurations (settings) 890, including subsets of settings of different security levels (860 and 870), allows to detect abnormalities of the network 800. For example, if a computer system 850 has configurations 880, that are not included in an allowed set of configuration settings 890, it can be concluded that the computer system 850 is infected (or is being used against network policy).

Using the abnormalities detection method, the behavior of a network user can also be monitored. A set of heuristic data can be created for each network user. An abnormal behavior of a particular network user can trigger certain limitations (i.e., user access rights and policies can be revoked). While monitoring the network, the AV application can create backups, incremental backups, snapshots and roll back points for stronger network protection.

Figure 9:
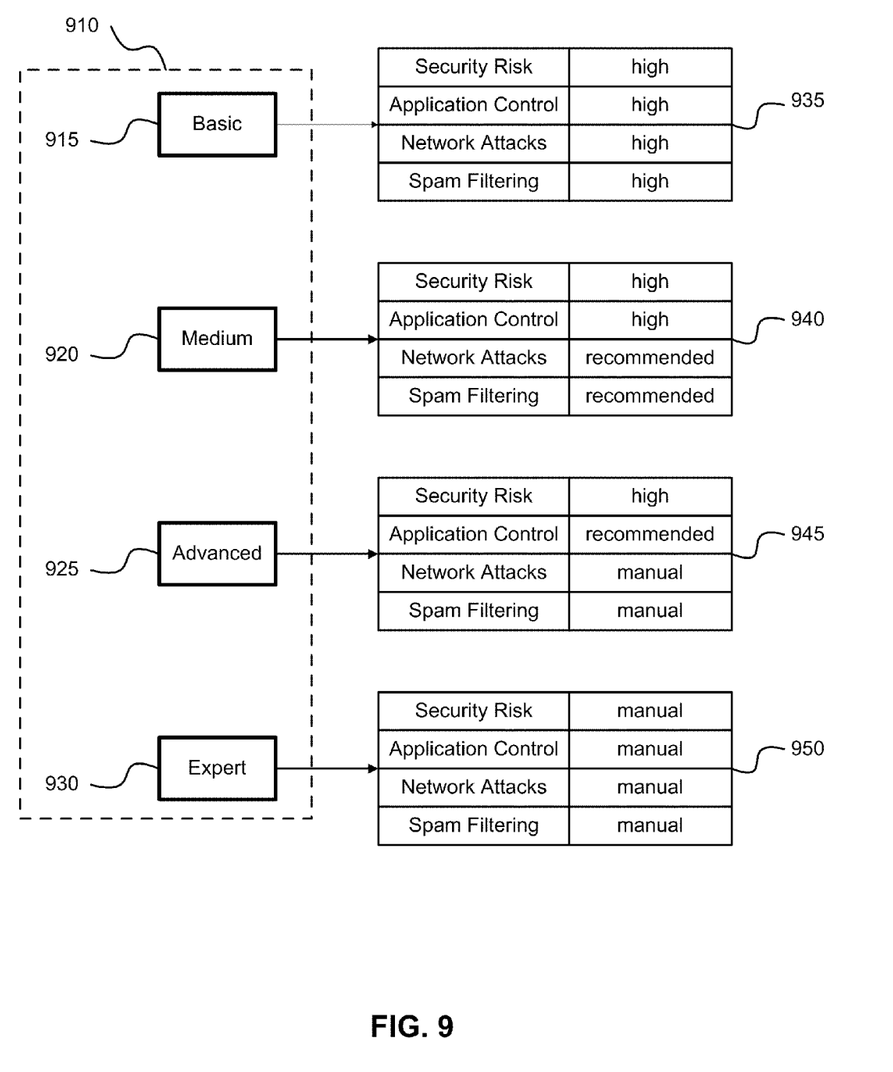
FIG. 9 illustrates an example of different levels of user settings used for working with AV application, in accordance with the exemplary embodiment.

Based on recorded user behavior patterns, some default setting can be assigned to a user for working with the AV application. Different levels of user settings are depicted in FIG. 9. For example, while choosing AV settings 910, a user can select basic settings 915, medium settings 920, advanced settings 925, and expert settings 930. For each of these settings the following security types are assigned:

Security Risk components for threat detection and system monitoring, which monitor file system, web clients and web activities of a user;

Application Control, which controls execution of running applications and blocks execution of dangerous operations;

Network Attacks, which prevents attacks on the network;

Spam Filtering, intended for protection from spam.

The protection levels can be high, recommended level, and manual security configurations. "High" uses previously setup parameters intended for an inexperienced user and requiring a significant degree of protection. "Recommended" refers to an average user, with somewhat lower degree of protection. "Manual" gives the user complete freedom to change the settings of the application. Those of ordinary skill in the art will appreciate that the proposed system and method optimize functionality of a computer system by asynchronous processing of the events without any interruption of execution of the processes that caused the events.

Note that a common situation is a new version of a legitimate program that behaves similar to the old version, but has some new functionality. The new version is not yet added to the database of the legitimate programs. The new version is initially treated as unknown, but may be initially viewed as malicious, since it first downloads a downloader, and then downloads the rest of the program. However, based on the fact that the previous version wrote the same registry keys, performed many of the same functions as the new version, etc., the new version will be classified as non-malicious.

For example, consider the Opera browser version 9.5.1 and 9.5.2. Some of the differences are as follows (see portions of the log below, differences shown in bold, note also that this is a small fraction of the actual log, with most of the rest of the logs being identical):

| Opera 9.5.1 | Unknown program (probably new version of Opera) |
|---|---|
| \Device\HarddiskVolume1\Documents and Settings\kulich\Local Settings\Application Data\Opera\Opera\profile\opcache\assoc\ | \Device\HarddiskVolume1\Documents and Settings\kulich\Local Settings\Application Data\Opera\Opera\profile\opcache\assoc\ |
| \Device\HarddiskVolume1\Documents and Settings\kulich\Local Settings\Application Data\Opera\Opera\profile\vps\ 0000 | \Device\HarddiskVolume1\Documents and Settings\kulich\Local Settings\Application Data\Opera\Opera\profile\vps\ 0000 |
| \Device\HarddiskVolume1\Documents and Settings\kulich\Local Settings\Application Data\Opera\Opera\profile\vps\0000\ adoc.bx adoc.bx-j md.dat md.dat-j url.ax url.ax-j w.ax w.ax-j wb.vx wb.vx-j | \Device\HarddiskVolume1\Documents and Settings\kulich\Local Settings\Application Data\Opera\Opera\profile\vps\0000\ adoc.bx adoc.bx-j md.dat md.dat-j url.ax url.ax-j w.ax w.ax-j wb.vx wb.vx-j |
| \Device\HarddiskVolume1\GIMM I\OPERAS\ 951 \Device\HarddiskVolume1\GIMM I\OPERAS\951\ | |
| \Device\HarddiskVolume1\PROGR AM FILES\ | \Device\HarddiskVolume1\PROGR AM FILES\ |
| \Device\HarddiskVolume1\PROGR AM FILES\OPERA\ ENCODING.BIN ENGLISH.LNG OPERA.DLL OPERA.EXE OPERADEF6.INI SEARCH.INI | \Device\HarddiskVolume1\PROGR AM FILES\OPERA\ ENCODING.BIN ENGLISH.LNG OPERA.DLL OPERA.EXE OPERADEF6.INI SEARCH.INI |
| \Device\HarddiskVolume1\PROGR AM FILES\OPERA\DEFAULTS\ DIALOG.INI FASTFORWARD.INI PLUGIN-IGNORE.INI SPELLCHECK.INI STANDARD_KEYBOARD.INI STANDARD_MENU.INI STANDARD_MOUSE.INI STANDARD_TOOLBAR.INI STANDARD_VOICE.INI | \Device\HarddiskVolume1\PROGR AM FILES\OPERA\DEFAULTS\ DIALOG.INI FASTFORWARD.INI PLUGIN-IGNORE.INI SPELLCHECK.INI STANDARD_KEYBOARD.INI STANDARD_MENU.INI STANDARD_MOUSE.INI STANDARD_TOOLBAR.INI STANDARD_VOICE.INI |
| \Device\HarddiskVolume1\PROG RAM FILES\OPERA\LOCALE\ | |
| \Device\HarddiskVolume1\PROGR AM FILES\OPERA\LOCALE\RU\ RU.LNG | \Device\HarddiskVolume1\PROGR AM FILES\OPERA\LOCALE\RU\ RU.LNG |
| \Device\HarddiskVolume1\PROGR AM FILES\OPERA\PROGRAM\ | \Device\HarddiskVolume1\PROGR AM FILES\OPERA\PROGRAM\ |
| \Device\HarddiskVolume1\PROGR AM FILES\OPERA\PROGRAM\PLUGINS\ | \Device\HarddiskVolume1\PROGR AM FILES\OPERA\PROGRAM\PLUGINS\ |
| \Device\HarddiskVolume1\PROGR AM FILES\OPERA\SKIN\ STANDARD_SKIN.ZIP | \Device\HarddiskVolume1\PROGR AM FILES\OPERA\SKIN\ STANDARD_SKIN.ZIP |
| \Device\HarddiskVolume1\PROGR | \Device\HarddiskVolume1\PROGR |

| Opera 9.5.1 | Unknown program (probably new version of Opera) |
|---|---|
| AM FILES\OPERA\STYLES\ CONTENTBLOCK.CSS MATHML.CSS WML.CSS \Device\HarddiskVolume1\PROGR AM FILES\OPERA\STYLES\USER\ DISABLEBREAKS.CSS DISABLEFLOATS.CSS DISABLEFORMS.CSS DISABLEPOSITIONING.CSS DISABLETABLES.CSS TABLELAYOUT.CSS \Device\HarddiskVolume1\PROGR A~1\ \Device\HarddiskVolume1\PROGR A~1\KASPER~1\ \Device\HarddiskVolume1\PROGR A~1\KASPER~1\KASPER~1\ | AM FILES\OPERA\STYLES\ CONTENTBLOCK.CSS MATHML.CSS WML.CSS \Device\HarddiskVolume1\PROGR AM FILES\OPERA\STYLES\USER\ DISABLEBREAKS.CSS DISABLEFLOATS.CSS DISABLEFORMS.CSS DISABLEPOSITIONING.CSS DISABLETABLES.CSS TABLELAYOUT.CSS \Device\HarddiskVolume1\PROGR A~1\ \Device\HarddiskVolume1\PROGR A~1\KASPER~1\ \Device\HarddiskVolume1\PROGR A~1\KASPER~1\KASPER~1\ |

Opera 9.5.1 wrote some data into its own folder Device\HarddiskVolume1\GIMMI\OPERAS\, while the new version does not write to that folder.

Another example is where the new version has an expanded caching mechanism (the new version stores more data in the cache in the folder \Device\ Harddisk Volume1\DOCUMENTS AND SETTINGS\ KULICH\LOCAL SETTINGS\APPLICATION DATA\ OPERA\OPERA\PROFILE\CACHE4\):

| Opera 9.5.1 | Unknown program (probably new version of Opera) |
|---|---|
| \Device\HarddiskVolume1\DOCUM ENTS AND SETTINGS\KULICH\LOCAL SETTINGS\APPLICATION DATA\OPERA\OPERA\PROFILE\ \Device\HarddiskVolume1\DOCUM ENTS AND SETTINGS\KULICH\LOCAL SETTINGS\APPLICATION DATA\OPERA\OPERA\PROFILE\ CACHE4\ DCACHE4.URL OPR00002 OPR00003 OPR00009 OPR0000A OPR0000B OPR0000F OPR0000Y OPR0000Z OPR00010 OPR00011 OPR00014 OPR00015 OPR00018 OPR0001C OPR0001E OPR0001G OPR0001H OPR0001I OPR0001K OPR0001N OPR0001P OPR0001Q OPR0001R OPR0001T OPR0001U OPR0001W | \Device\HarddiskVolume1\DOCU MENTS AND SETTINGS\KULICH\LOCAL SETTINGS\APPLICATION DATA\OPERA\OPERA\PROFILE \ \Device\HarddiskVolume1\DOCU MENTS AND SETTINGS\KULICH\LOCAL SETTINGS\APPLICATION DATA\OPERA\OPERA\PROFILE \CACHE4\ DCACHE4.URL OPR00002 OPR00003 OPR00009 OPR0000A OPR0000B OPR0000F OPR0000Y OPR0000Z OPR00010 OPR00011 OPR00012 OPR00014 OPR00015 OPR00016 OPR00017 OPR00018 OPR00019 OPR0001B OPR0001C OPR0001D OPR0001E OPR0001F OPR0001G OPR0001H OPR0001I OPR0001K OPR0001L OPR0001N OPR0001P OPR0001Q OPR0001R |

-continued

| Opera 9.5.1 | Unknown program (probably new version of Opera) |
|---|---|
| OPR0001X | OPR0001T |
| OPR0001Y | OPR0001U |
| OPR0001Z | OPR0001W |
| OPR00020 | OPR0001X |
| OPR00021 | OPR0001Y |
| OPR00022 | OPR0001Z |
| OPR00023 | OPR00020 |
| OPR00024 | OPR00021 |
| OPR0002E | OPR00022 |
| OPR0002Z | OPR00023 |
| OPR00030 | OPR00024 |
| OPR00031 | OPR0002E |
|  | OPR0002Z |
| OPR00034 | OPR00030 |
| OPR00035 | OPR00031 |
| OPR00036 | OPR00033 |
|  | OPR00034 |
| OPR00038 | OPR00035 |
| OPR0003A | OPR00036 |
|  | OPR00037 |
| OPR0003F | OPR00038 |
| OPR0003H | OPR0003A |
|  | OPR0003B |
|  | OPR0003F |
| OPR0003M | OPR0003H |
| OPR0003N | OPR0003K |
| OPR0003O | OPR0003L |
| OPR0003P | OPR0003M |
| OPR0003Q | OPR0003N |
| OPR0003R | OPR0003O |
| OPR0003S | OPR0003P |
|  | OPR0003Q |
|  | OPR0003R |
| OPR0003W | OPR0003S |
| OPR0003X | OPR0003T |
| OPR0003Y | OPR0003U |
| OPR0003Z | OPR0003W |
| OPR00041 | OPR0003X |
| OPR00043 | OPR0003Y |
| OPR00044 | OPR0003Z |
| OPR00045 | OPR00041 |
| OPR00046 | OPR00043 |
| OPR0004D | OPR00044 |
| OPR00052 | OPR00045 |
| OPR00053 | OPR00046 |
| OPR0005Q | OPR0004D |
|  | OPR00052 |
|  | OPR00053 |
|  | OPR0005Q |
|  | OPR00064 |
|  | OPR00067 |
|  | OPR0006N |
| \Device\HarddiskVolume1\DOCUM ENTS AND SETTINGS\KULICH\LOCAL SETTINGS\APPLICATION DATA\OPERA\OPERA\PROFILE\ CACHE4\REVOCATION\ DCACHE4.URL VLINK4.DAT | OPR0006O OPR0006Z OPR00070 \Device\HarddiskVolume1\DOCU MENTS AND SETTINGS\KULICH\LOCAL SETTINGS\APPLICATION DATA\OPERA\OPERA\PROFILE \CACHE4\REVOCATION\ DCACHE4.URL VLINK4.DAT |

All the above examples show "good" changes (i.e., they use only resources of the Opera browser itself), and therefore, it can be concluded that this is a new version of Opera. On the other hand, if the new version had, for example, the following activities:

Use of system folders
Changing of drivers
Use of binary files

Figure 10:
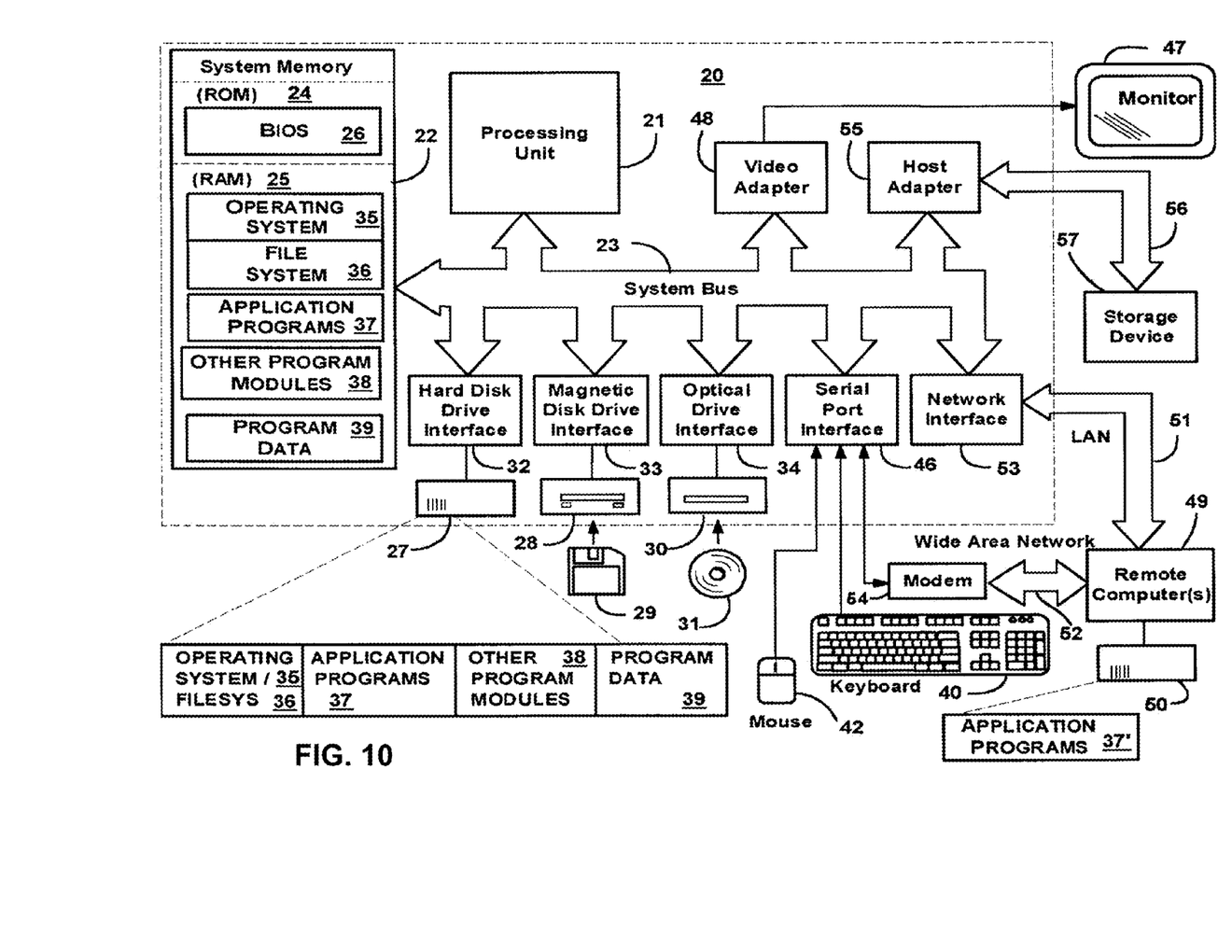
FIG. 10 illustrates a schematic of an exemplary computer system on which the invention can be implemented.

Then it could be concluded that this is malicious activity, and the browser is infected. Other examples of malicious activities in the Opera browser are those affecting the following:

DeviceHardDiskVolume1\windows\system32
notepad.exe
regedit.exe
calc.exe
DeviceHardDiskVolume1\windows\system32\drivers
Acpi.sys http.sys
beep.sys With reference to FIG. 10, an exemplary system for implementing the invention includes a general purpose computing device in the form of a computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide a non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for an effective, on-the-fly detection of malware based on asynchronous processing of events generated by applications running on a computer system.

It should also be appreciated that various modifications, adaptations and alternative embodiments thereof may be made within the scope and spirit of the present invention. The invention is further defined by the following claims.

What is claimed is:

1. A method for asynchronous processing of events on a computer system, the method comprising:
    (a) detecting a system call on the computer system;
    (b) filtering the system call to determine when the system call matches a security criteria;
    (c) creating a copy of the system call and asynchronously processing the system call copy, if the system call does not pass through at least one filter, and at least one of the filter security criteria does not match the system call;
    (d) placing the system call into a queue for processing;
    (e) releasing the system call by performing further processing on the event copy;
    (f) deleting the system call copy from the queue;
    (g) processing the system call copy, wherein the processing of the system call copy comprises anti-virus (AV) checking of the system call copy and terminating an object that caused the system call, when the AV check reveals a malicious nature of the system call; and
    (h) for an object associated with the system call that has behavior differences compared to a previous known non-malicious version of the object but also similarities to the previous known non-malicious object, classifying the object as non-malicious,
    wherein steps (b)-(h) are performed sequentially on the computer system without interrupting execution of the system call on the computer system.

2. The method of claim 1, further comprising generating a behavior log for the object that caused the system call.

3. The method of claim 2, wherein the behavior log is used for the AV check of network configurations.

4. The method of claim 2, wherein the behavior log and a number of accesses of a web site are used for the AV check of the web site.

5. The method of claim 1, wherein the filtering of the system call comprises processing the system call through at least one filter.

6. The method of claim 1 further comprising creating a control record based on the system call copy, wherein the control record contains heuristic data related to the system call.

7. The method of claim 6, wherein AV checking the system call comprises an AV check of the control record.

8. The method of claim 2, wherein the processing of the behavior log comprises any of:
   a signature detection;
   an event emulation; and
   a heuristic detection.

9. The method of claim 8, wherein heuristic detection employs data from any of the behavior log, from a remote database and a local database.

10. The method of claim 1, wherein the processing of the system call copy further comprises adding the object, which caused the system call, to a white list or to a black list, based on the degree of similarity to a previously known object.

11. The method of claim 10, wherein the white list and the black list are analyzed for false positives.

12. The method of claim 11, wherein the false positive analysis comprises detecting collisions between the white list and the black list.

13. A system for asynchronous processing of events, the system comprising a processor, a memory coupled to the processor, and computer code loaded into the memory for implementing the steps of:
   (a) detecting a system call on the computer system;
   (b) filtering the system call to determine when the system call matches a security criteria;
   (c) creating a copy of the system call and asynchronously processing the system call copy, if the system call does not pass through at least one filter, and at least one of the filter security criteria does not match the system call;
   (d) placing the system call into a queue for processing;
   (e) releasing the system call by performing further processing on the event copy;
   (f) deleting the system call copy from the queue;
   (g) processing the system call copy, wherein the processing of the system call copy comprises anti-virus (AV) checking of the system call copy and terminating an object that caused the system call, when the AV check reveals a malicious nature of the system call; and
   (h) for an object associated with the system call that has behavior differences compared to a previous known non-malicious version of the object but also similarities to the previous known non-malicious object, classifying the object as non-malicious,
   wherein steps (b)-(h) are performed sequentially on the computer system without interrupting execution of the system call on the computer system.

14. The system of claim 13, wherein processing of the object that caused the system call by an AV module determines whether the object is malicious.

15. The system of claim 14, wherein when the object is deemed malicious, activity of the object is terminated.

16. The system of claim 14, wherein when the object is deemed malicious, functionality of the object is restricted.

17. The system of claim 14, wherein when the object is deemed malicious on a different computer, the object is also deemed malicious on the computer system.

18. The system of claim 13, wherein the system further includes any of the following application modules:
   a firewall;
   an AV (antivirus) module;
   a HIPS (host intrusion protection system);
   a web AV (antivirus);
   a mail AV;
   a traffic AV;
   a script AV;
   an emulator; and
   a PDM (proactive defense module).

19. The system of claim 13, wherein the at least one filter allows through core system calls.

20. The system of claim 19, wherein the system calls are AV-checked when they pass through the at least one filter.

* * * * *